United States Patent
Hannewald et al.

(10) Patent No.: US 7,114,486 B2
(45) Date of Patent: Oct. 3, 2006

(54) SUBUNIT OF A THROTTLE VALVE HOUSING

(75) Inventors: Thomas Hannewald, Griesheim (DE); Stefan Koehler, Frankfurt (DE); Roland Lindner, Liederbach (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 11/214,476

(22) Filed: Aug. 30, 2005

(65) Prior Publication Data

US 2006/0027210 A1     Feb. 9, 2006

Related U.S. Application Data

(63) Continuation of application No. PCT/DE2003/004153, filed on Dec. 16, 2003.

(30) Foreign Application Priority Data

Mar. 10, 2003    (DE)    ............... 103 10 744

(51) Int. Cl.
*F02D 9/08*     (2006.01)
*F16K 1/22*     (2006.01)

(52) U.S. Cl. ................... 123/337; 251/305

(58) Field of Classification Search ........... 123/337, 123/568.24; 251/305
See application file for complete search history.

(56) References Cited

U.S. PATENT DOCUMENTS

| | | | |
|---|---|---|---|
| 2,058,996 A | | 10/1936 | Kollberg |
| 2,840,338 A | | 6/1958 | Shaw |
| 3,260,502 A | | 7/1966 | Plumer |
| 3,521,857 A | * | 7/1970 | Over ............ 251/305 |
| 3,627,261 A | * | 12/1971 | Ludeman ............ 251/305 |
| 4,899,984 A | | 2/1990 | Strickler et al. |
| 5,035,214 A | * | 7/1991 | Daly et al. ............ 123/337 |
| 5,081,972 A | * | 1/1992 | Daly et al. ............ 123/337 |
| 5,465,756 A | * | 11/1995 | Royalty et al. ...... 137/625.31 |
| 6,702,257 B1 | * | 3/2004 | Mollmann ............ 251/306 |
| 2003/0034474 A1 | | 2/2003 | Proctor et al. |
| 2005/0183705 A1 | * | 8/2005 | Nanba et al. ......... 123/568.24 |

FOREIGN PATENT DOCUMENTS

| | | |
|---|---|---|
| DE | GM 1 683 498 | 8/1954 |
| DE | GM 77 22 015 | 10/1977 |
| DE | 195 12 874 A1 | 10/1996 |
| DE | 101 50 166 A1 | 5/2003 |
| FR | 2 687 601 A1 | 8/1993 |
| GB | 2 172 381 A | 9/1986 |

OTHER PUBLICATIONS

Derwent Abstract—DE 101 50 166 A1 May 8, 2003 Wacker-Chemie GmbH, D-181737 München, Germany.
Abstract—GM 77 22 015 Oct. 20, 1977 Polysius AG, D-4753 Neubeckum, Germany.
Abstract—GM 1 683 498 Aug. 25, 1954 Bopp & Reuther GmbH, D-68305 Mannheim-Waldhof, Germany.

(Continued)

*Primary Examiner*—Hai Huynh
(74) *Attorney, Agent, or Firm*—Siemens AG

(57) ABSTRACT

The dividing unit comprises a metal throttle valve shaft and of a plastic throttle valve. The throttle valve shaft is mounted so that it centrally passes through the throttle valve and the maximum acute angle alpha between the longitudinal axis of the throttle valve shaft and another longitudinal axis of the throttle valve ranges from 5 DEG to 25 DEG.

3 Claims, 3 Drawing Sheets

OTHER PUBLICATIONS

Abstract—FR 2 687 601 A1 Aug. 27, 1993 Compagnie Plastic Omnium, F-92593 Levallois Cedex, France.

Derwent Abstract—DE 195 12 874 A1 Oct. 10, 1996 VDO Adolf Schindling AG, D-60326 Frankfurt, Germany.

* cited by examiner

SUBUNIT OF A THROTTLE VALVE HOUSING

BACKGROUND OF THE INVENTION

The invention relates to a subunit of a throttle valve housing. Throttle valve housings are known. DE 195 12 874 A1 and also FR 2 687 601 A1 describe a throttle valve housing which is arranged in a tubular casing. Here, the throttle valve is fastened on a throttle valve shaft which is mounted so as to rotate in bearings and to pass through recesses in the casing wall at its free ends transversely with respect to the longitudinal axis of the tubular casing. In the closed state, the throttle valve divides the casing into a suction side and into a side in which atmospheric pressure prevails. In this known throttle valve housing, it is disadvantageous that, as a result of the vacuum which is present in the suction side, leakage air can pass via the bearings of the throttle valve shaft into the suction side, which is not desirable.

US 2003/0034474 A1 describes a throttle valve which is arranged in an inclined manner with respect to the throttle valve shaft. Additional measures are not described for sealing between the circumferential edge of the throttle valve and the throttle valve housing. U.S. Pat. No. 3,260,502 and U.S. Pat. No. 4,899,984 describe throttle valves made from metal, in which circumferential sealing elements are provided. In order to seal these sealing elements against the inner side of the throttle valve housing, additional elastic elements are provided which press the sealing ring against the throttle valve housing on one side and against the throttle valve on the other side.

The invention is therefore based on the object of providing a subunit for a throttle valve housing, as a result of which subunit it is largely avoided that leakage air flows in via the bearings of the throttle valve shaft to the suction side of the air duct.

SUMMARY OF THE INVENTION

The object on which the invention is based is achieved by a subunit of a throttle valve housing.

The subunit comprises individual components which are assembled. Here, the throttle valve shaft usually consists of steel. The throttle valve is of, for example, circular or oval and substantially disk-shaped design and consists, for example, of polyphenylene sulfide. The throttle valve shaft is arranged so as to be guided centrally through the throttle valve, which is to be understood as meaning that the throttle valve shaft is not guided through the throttle valve laterally offset with respect to the diameter of the throttle valve but so as to pass through the longitudinal axis of the latter. Here, the throttle valve itself can be injection molded directly onto the throttle valve shaft or fastened in another way. The maximum acute angle $\alpha$ is to be understood as the angle of inclination of the throttle valve in relation to the longitudinal axis of the throttle valve shaft. In the closed state, the outer edge of the throttle valve lies flush on the inner wall of the air duct in an almost airtight manner. It has been shown surprisingly that the suction side of the air duct can be closed off by the subunit of a throttle valve housing in such a way that no leakage air can pass to the suction side of the air duct through the bearings in which the throttle valve shaft is rotatably mounted. The arrangement of the throttle valve at the maximum acute angle $\alpha$ between the longitudinal axis of the throttle valve shaft and a further longitudinal axis of the throttle valve ensures that the first bearing for the throttle valve shaft is to be assigned to the one side in which atmospheric pressure prevails, while the second bearing for the throttle valve shaft is to be assigned to the suction side of the air duct. However, said second bearing is sealed off hermetically from the side of the air duct in which atmospheric pressure prevails by the oblique arrangement of the throttle valve, in such a way that the passage of leakage air is not possible.

Furthermore, there is provision for a tolerance ring made from plastic to be arranged in the circumferential groove. Here, the tolerance ring made from plastic can consist of, for example, polytetrafluoroethylene. As a rule, it is configured as a flat ring and has a continuous gap. When the suction side of the air duct is closed off, the outer side of the tolerance ring is pressed against the air duct, with the result that the gap is reduced or closed completely. The stress which is produced in the tolerance ring as a result additionally presses the tolerance ring against the inner wall of the air duct, which reinforces tight closing off toward the suction side of the air duct.

One preferred refinement of the invention consists in that the throttle valve has at least one sleeve section which surrounds the throttle valve shaft at least partially. Here, it is advantageous as a rule to arrange one or two sleeve sections accordingly. The partial surrounding of the throttle valve shaft by at least one sleeve section makes the assembly of the subunit easier in a particularly advantageous way, as the throttle valve can be pushed with the at least one sleeve section onto the throttle valve shaft in a relatively simple way and can be fastened subsequently to the latter. It is, however, also possible to combine these two process steps with one another by a single-stage injection molding process. Furthermore, the arrangement of the at least one sleeve section increases the stability of the subunit of a throttle valve housing, as the throttle valve can be fixed to the throttle valve shaft in a more stable manner.

According to a further preferred refinement of the invention, there is provision for at least one intermediate layer made from a metallic material to be arranged between the throttle valve shaft and the throttle valve. In this case too, the intermediate layer can advantageously consist of steel. It is possible here for the intermediate layer to be pushed onto the throttle valve shaft in the form of a sleeve and for the throttle valve to be injection molded onto it subsequently. However, it is also possible to connect the intermediate layer initially to the throttle valve and to connect this combination subsequently to the throttle valve shaft. Depending on the configuration of the throttle valve and its at least one sleeve section, this can be carried out here, for example, by laser welding or resistance welding. The arrangement of the intermediate layer made from a metallic material increases the stability of the subunit of a throttle valve housing in a particularly advantageous manner, which has a particularly advantageous effect on the service life of the subunit of a throttle valve housing.

According to a further refinement of the invention, a single intermediate layer is arranged in the central region of the throttle valve. As a rule, a single intermediate layer is sufficient in order to impart relatively high stability to the subunit of the throttle valve housing. In order to ensure a homogeneous distribution of the forces in the interior of the subunit of a throttle valve housing, it is then particularly advantageous to arrange the single intermediate layer in the central region of the throttle valve.

According to a further refinement of the invention, the intermediate layer has a roughened surface oriented toward the throttle valve. Here, the roughened surface can be provided by appropriate groove patterns being arranged. Here, it is advantageous that the connection of the intermediate layer to the throttle valve made from plastic is reinforced, as the plastic can be pressed into the roughened surface and the fixing is thus carried out in a particularly stable manner.

A further preferred refinement of the invention consists in that the throttle valve has an outwardly circumferential groove. This has the advantage that sealing elements can be inserted into the outwardly circumferential groove, which simplifies and reinforces the tight sealing off of the suction side of the air duct to a particular extent.

BRIEF DESCRIPTION OF THE SEVERAL VIEWS OF THE DRAWINGS

In the following text, the invention will be explained in greater detail and by way of example using the drawing (FIG. 1 to FIG. 7).

DETAILED DESCRIPTION OF THE INVENTION

Figure 1:
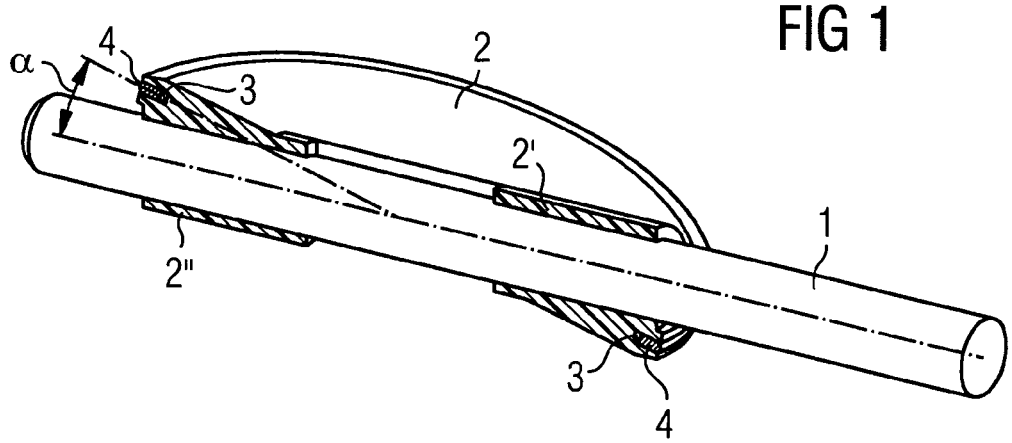
FIG. 1 shows the subunit of a throttle valve housing in a diagrammatically simplified cross section.

FIG. 1 shows the subunit of a throttle valve housing in cross section in a simplified and diagrammatic form. It comprises a throttle valve shaft 1 made from metal and a throttle valve 2 made from plastic, the throttle valve shaft 1 being arranged so as to be guided through the throttle valve 2 centrally.

Here, the maximum acute angle α between the longitudinal axis of the throttle valve shaft 1 and a further longitudinal axis of the throttle valve 2 lies in the range between 5° and 25 °.

The throttle valve 2 has a first sleeve section 2' and a second sleeve section 2" which surround the throttle valve shaft 1 at least partially. The first sleeve section 2' and the second sleeve section 2" are arranged at a certain spacing from one another. Furthermore, the throttle valve 2 has a circumferential groove 3 in which a tolerance ring 4 made from plastic is arranged. Said tolerance ring 4 improves the sealing action when the air duct (not shown) is closed by the throttle valve 2.

Figure 2:
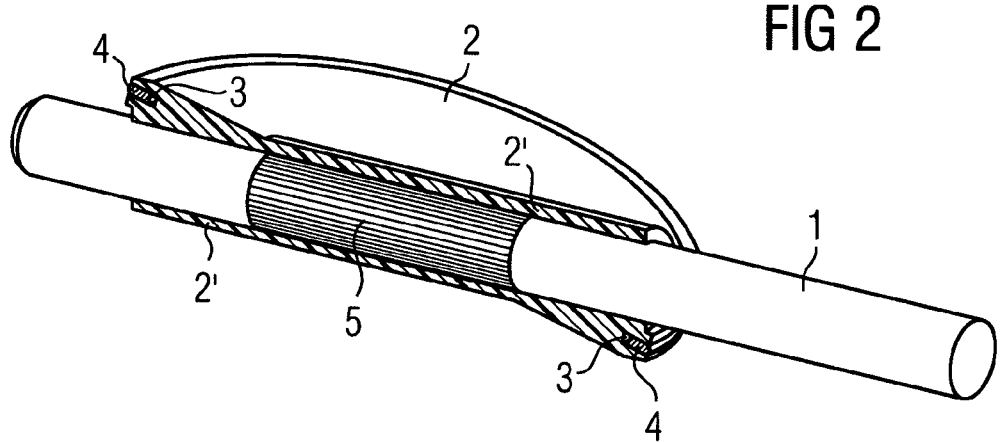
FIG. 2 shows the subunit of a throttle valve housing in a diagrammatically simplified cross section, with the arrangement of a single intermediate layer.

FIG. 2 shows a subunit of a throttle valve housing in cross section in a simplified and diagrammatic form, in which a single intermediate layer 5 is arranged in the central region of the throttle valve 2 between the throttle valve shaft 1 and the throttle valve 2. Here, the intermediate layer 5 has a roughened surface oriented toward the throttle valve 2. The connection between the intermediate layer 5 and the throttle valve 2 is reinforced and thus improved by said roughened surface. During the assembly of the subunit of a throttle valve housing, the throttle valve 2 can, for example, first be injection molded around the intermediate layer 5, and then the unit comprising the intermediate layer 5 and the throttle valve 2 can be pushed onto the throttle valve shaft 1. Here, the fixing on the throttle valve shaft 1 can be carried out in a last step by a screw connection (not shown). However, it is also possible to push the intermediate layer 5 onto the throttle valve shaft 1 in the form of a sleeve, and then subsequently in a further step to arrange the throttle valve 2 made from plastic by an injection molding process. The intermediate layer 5 increases the stability of the subunit of the throttle valve housing.

Figure 3:
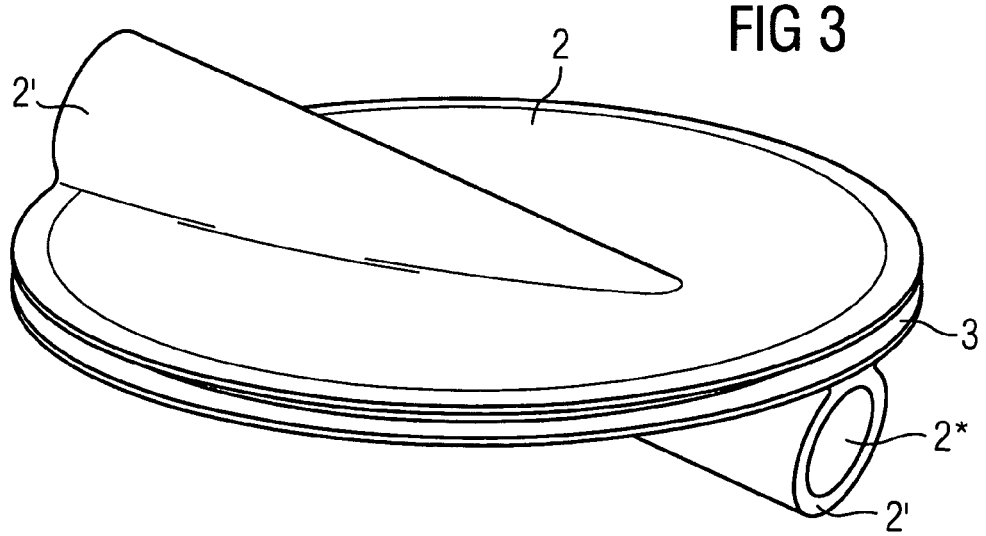
FIG. 3 shows a throttle valve made from plastic and having a single sleeve section, in three-dimensional form.

FIG. 3 shows the throttle valve 2 in three-dimensional form.

It has a single sleeve section 2' which has an inner, cylindrically configured channel 2* for accommodating the throttle valve shaft (not shown). The throttle valve shaft is pushed through said inner channel 2* and is thus arranged in this way so as to be guided centrally through the throttle valve 2 (not shown).

Figure 4:
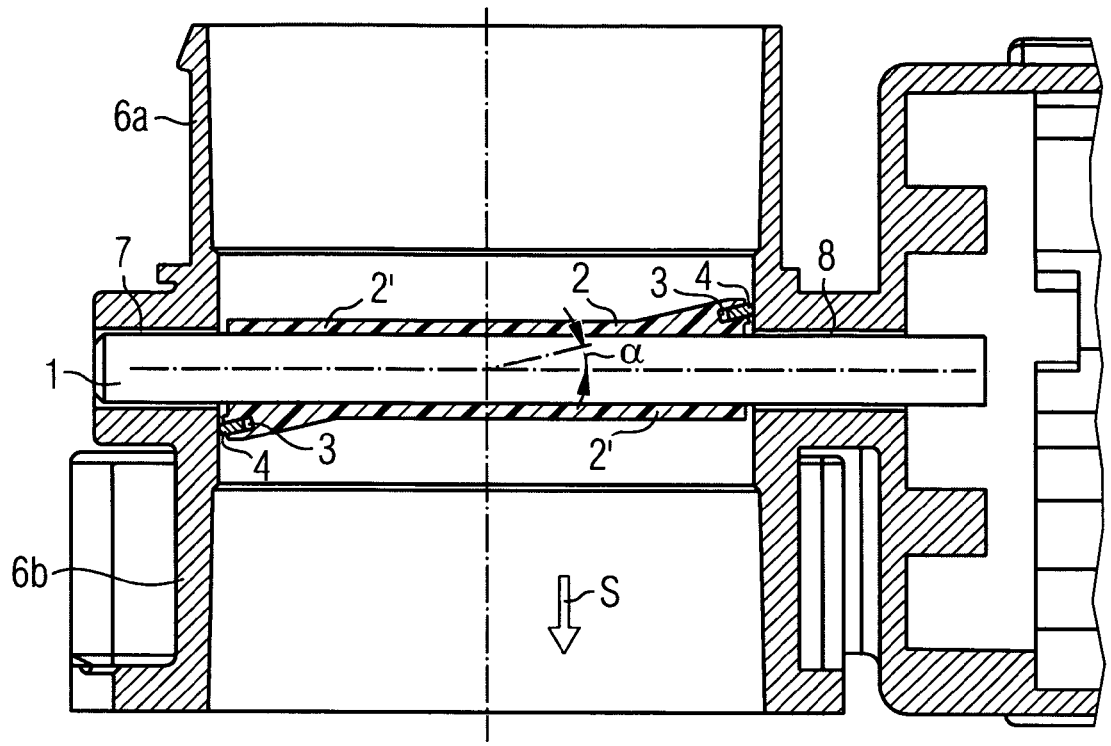
FIG. 4 shows the arrangement of the subunit of a throttle valve housing in an air duct which extends continuously perpendicularly, in cross section.

FIG. 4 shows the arrangement of the subunit of a throttle valve housing in an air duct with perpendicular flow guidance, in a simplified and diagrammatic form. Here, the throttle valve shaft 1 is arranged perpendicularly with respect to the flow direction in the direction of the arrow and is mounted rotatably in a first bearing 7 and in a second bearing 8. The air duct itself is formed by a first housing section 6a and a second housing section 6b. The first housing section 6a encloses that side of the air duct in which atmospheric pressure prevails. The second housing section 6b encloses the suction side S of the air duct in which vacuum prevails. Here, that side in which atmospheric pressure prevails is sealed off tightly from the suction side S exclusively by the arrangement of the tolerance ring 4 which, in the closed state which is shown, is in fixed contact with the inner wall of the air duct. Here, the first bearing 7 is thus to be assigned to that side in which atmospheric pressure prevails. The second bearing 8 is to be assigned to the suction side S in a corresponding way. The arrangement of the throttle valve 2 with a maximum acute angle α which lies between 5° and 25° being adhered to thus avoids the situation where leakage air can pass out of the first housing section 6a into the second housing section 6b neither via the first bearing 7 nor via the second bearing 8.

Figure 5:
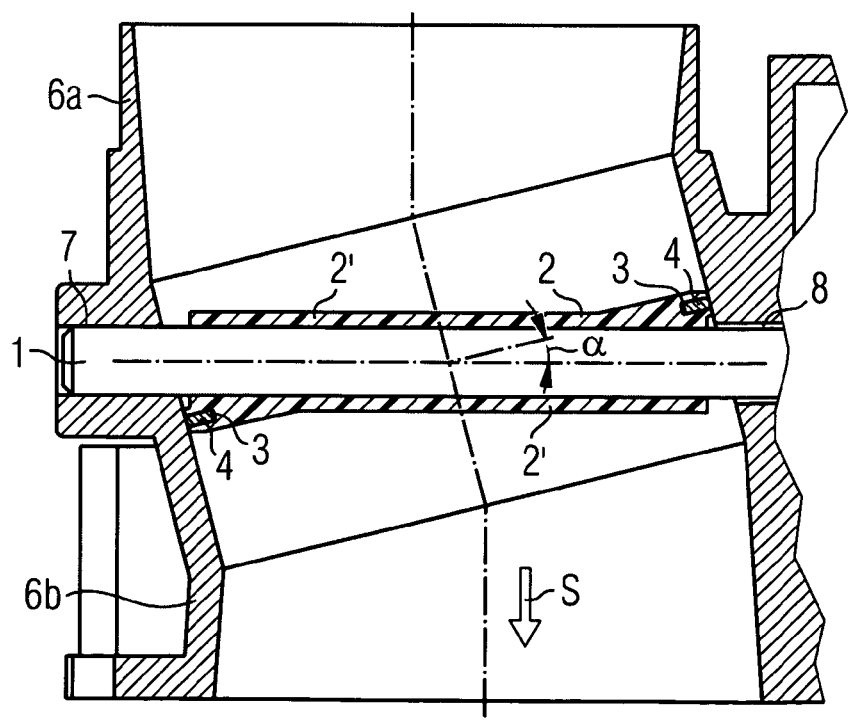
FIG. 5 shows the arrangement of the subunit of a throttle valve housing in an air duct in cross section, the gases experiencing a lateral directional change as viewed from the cross section.

FIG. 5 shows the arrangement of the subunit of a throttle valve housing in an air duct, in a simplified and diagrammatic form, the longitudinal axes of the first housing section 6a and the second housing section 6b being arranged offset with respect to one another. Even in an alternative arrangement of this type, it is advantageously avoided that leakage air flows into the second housing section 6b. However, it is also possible in general for the throttle valve shaft 1 to be arranged offset at an angle to the longitudinal axes of the first housing section 6a and the second housing section 6b (not shown).

Figure 6:
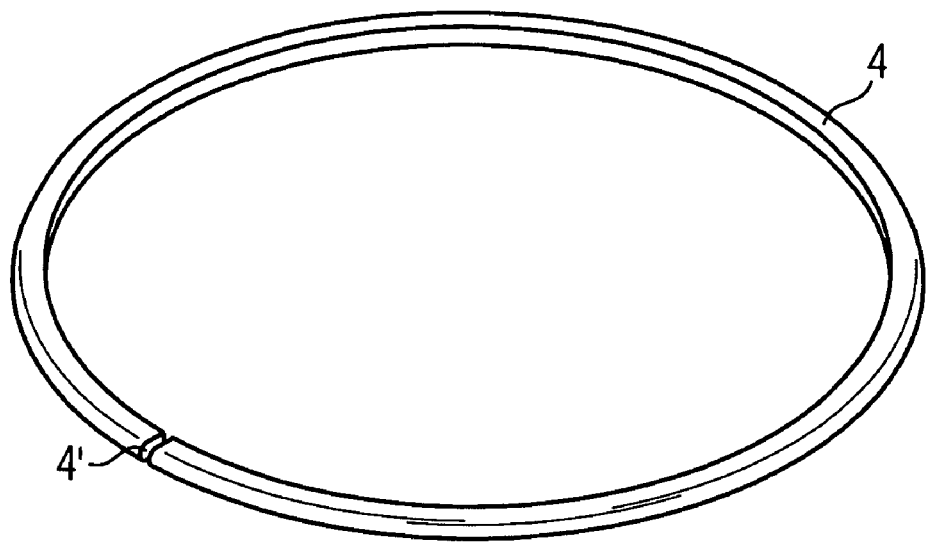
FIG. 6 shows the perspective view of a tolerance ring made from plastic.

FIG. 6 shows a tolerance ring 5 made from plastic in a perspective view. It has a gap 4' which serves to absorb tolerances when the air duct is closed (not shown). The tolerance ring 4 is configured as a flat ring and consists of, for example, polytetrafluoroethylene.

Figure 7:
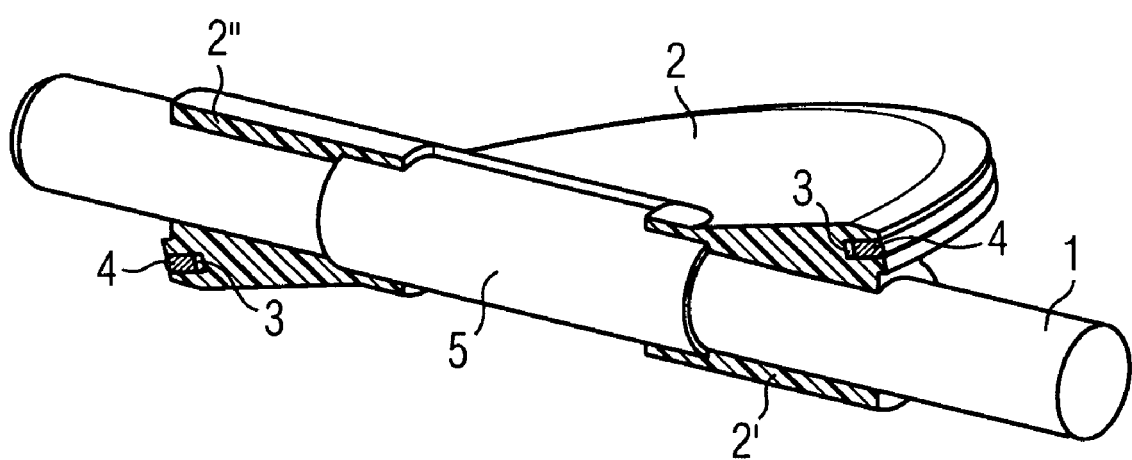
FIG. 7 shows the subunit of a throttle valve housing in a diagrammatically simplified cross section, having a first sleeve section and a second sleeve section.

FIG. 7 shows the subunit of a throttle valve housing in cross section in a simplified and diagrammatic form, in which an intermediate layer 5 made from a metallic material is arranged between the first sleeve section 2' and the second sleeve section 2″. Here, the subunit of the throttle valve housing can advantageously be assembled in such a way that first of all the intermediate layer 5 made from the metallic material is connected to the throttle valve 2. The unit which is produced in this way is subsequently pushed onto the throttle valve shaft 1. The throttle valve 2 can be connected to the throttle valve shaft 1 in a concluding step via the intermediate layer 5 made from a metallic material in the clearance between the first sleeve section 2′ and the second sleeve section 2″ by means of laser welding.

The invention claimed is:

1. A subunit of a throttle valve housing, comprising:
   a metallic throttle valve shaft;
   a plastic throttle valve arranged with respect to the throttle valve shaft to guide the throttle valve shaft centrally through the throttle valve at a maximum acute angle of inclination $\alpha$ between a longitudinal axis of the throttle valve shaft and the throttle valve between 5° and 25°, the throttle valve comprising at least one sleeve arranged to at least partially surround the throttle valve shaft;
   at least one intermediate layer comprising a metallic material, the intermediate layer arranged between the throttle valve shaft and the throttle valve;
   an outwardly circumferential groove in the throttle valve; and
   a plastic tolerance ring positioned in the circumferential groove, the plastic tolerance ring including a gap.

2. The subunit according to claim 1, wherein the at least one intermediate layer comprises a single intermediate layer arranged in a central region of the throttle valve.

3. The subunit according to claim 1, wherein the at least one intermediate layer comprises a roughened surface oriented toward the throttle valve.

* * * * *